US010552168B2

(12) United States Patent
Huntley et al.

(10) Patent No.: US 10,552,168 B2
(45) Date of Patent: Feb. 4, 2020

(54) DYNAMIC MICROSYSTEM RECONFIGURATION WITH COLLABORATIVE VERIFICATION

(71) Applicant: Intel Corporation, Santa Clara, CA (US)

(72) Inventors: Barry E. Huntley, Hillsboro, OR (US); Ned M. Smith, Beaverton, OR (US); Rajesh Poornachandran, Portland, OR (US); Simon Hunt, Naples, FL (US); Priyadarsini Devanand, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 15/605,070

(22) Filed: May 25, 2017

(65) Prior Publication Data

US 2018/0341496 A1 Nov. 29, 2018

(51) Int. Cl.
*G06F 9/44* (2018.01)
*G06F 15/78* (2006.01)
*G06F 21/57* (2013.01)
*G06F 9/4401* (2018.01)
*G06F 9/50* (2006.01)

(52) U.S. Cl.
CPC ............ *G06F 9/4401* (2013.01); *G06F 9/441* (2013.01); *G06F 9/5077* (2013.01); *G06F 15/7807* (2013.01); *G06F 21/57* (2013.01)

(58) Field of Classification Search
CPC ...... G06F 9/4401; G06F 9/441; G06F 9/5077; G06F 15/7807; G06F 21/57
See application file for complete search history.

(56) References Cited

U.S. PATENT DOCUMENTS

| 7,673,113 | B2* | 3/2010 | Sugumar | G06F 9/5088 |
| | | | | 711/170 |
| 7,992,151 | B2* | 8/2011 | Warrier | G06F 9/5077 |
| | | | | 718/104 |
| 2017/0293451 | A1* | 10/2017 | Pan | G06F 3/061 |

OTHER PUBLICATIONS

Intel, "Getting Started with Intel® Active Management Technology (AMT)", Retrieved from <https://software.intel.com/en-us/articles/getting-started-with-intel-active-management-technology-amt> on Apr. 15, 2017, 6 pages.

(Continued)

*Primary Examiner* — Stefan Stoynov
(74) *Attorney, Agent, or Firm* — Barnes & Thornburg LLP

(57) ABSTRACT

A method dynamically reconfigures a system on a chip (SOC) comprising multiple semiconductor intellectual property (IP) blocks. The method comprises, when booting a data processing system (DPS) comprising the SOC, automatically allocating different IP blocks to multiple different microsystems within the DPS, based on a static partitioning policy (SPP). The method also comprises, after booting the DPS, determining that reallocation of at least one of the IP blocks is desired, based on (a) monitored conditions of at least one of the microsystems and (b) a dynamic partitioning policy (DPP). The method also comprises, in response to determining that reallocation of at least one of the IP blocks is desired, automatically reallocating at least one of the IP blocks from one of the microsystems to another of the microsystems without resetting at least one of the microsystems. Other embodiments are described and claimed.

25 Claims, 8 Drawing Sheets

(56) References Cited

OTHER PUBLICATIONS

Junkins, Stephen, "The Compute Architecture of Intel Processor Graphics Gen7.5", Version 1.0, Aug. 1, 2014, 16 pages.
Smith, et al., "Methods and Apparatus to Facilitate Blockchain-Based Boot Tracking", U.S. Appl. No. 15/279,761, filed Sep. 29, 2016, 40 pages.
Smith, et al., "Onboarding and Accounting of Devices Into an Hpc Fabric", U.S. Appl. No. 15/392,379, filed Dec. 28, 2016, 35 pages.
Smith, et al., "Blockchain System With Nucleobase Sequencing as Proof of Work", U.S. Appl. No. 15/179,986, filed Jun. 11, 2016, 44 pages.
Wikipedia, "Bitstream", Retrieved from <https://en.wikipedia.org/wiki/Bitstream> on Mar. 26, 2017, 3 pages.
Wikipedia, "CPU Cache", Retrieved from <https://en.wikipedia.org/wiki/CPU_cache> on Mar. 20, 2017, 23 pages.
Wikipedia, "Intel Active Management Technology", Retrieved from <https://en.wikipedia.org/wiki/Intel_Active_Management_Technology> on Mar. 25, 2017, 13 pages.
Wikipedia, "Platform Controller Hub", Retrieved from <https://en.wikipedia.org/wiki/Platform_Controller_Hub> on Mar. 25, 2017, 10 pages.
Wikipedia, "PSoC", Retrieved from <https://en.wikipedia.org/wiki/PSoC> on Mar. 20, 2017, 6 pages.
Wikipedia, "Semiconductor Intellectual Property Core", Retrieved from <https://en.wikipedia.org/wiki/Semiconductor_intellectual_property_core> on May 23, 2017, 5 pages.
Wikipedia, "System on a Chip", Retrieved from <https://en.wikipedia.org/wiki/System_on_a_chip> on Mar. 20, 2017, 5 pages.
Wikipedia, "Trusted Execution Technology", Retrieved form <https://en.wikipedia.org/wiki/Trusted_Execution_Technology> on Mar. 26, 2017, 5 pages.
Wikipedia, "Trusted Platform Module", Retrieved from <https://en.wikipedia.org/wiki/Trusted_Platform_Module> on Mar. 20, 2017, 9 pages.
Wikipedia, "Uncore", Retrieved from <https://en.wikipedia.org/wiki/Uncore> on Mar. 22, 2017, 2 pages.
Wikipedia, "Unified Extensible Firmware Interface", Retrieved from <https://en.wikipedia.org/wiki/Unified_Extensible_Firmware_Interface> on Apr. 15, 2017, 17 pages.
Wikipedia, "x86 Virtualization", Retrieved from <https://en.wikipedia.org/wiki/X86_virtualization> on Mar. 20, 2017, 8 Pages.
Wikipedia, "Advanced Programmable Interrupt Controller", Retrieved from <https://en.wikipedia.org/wiki/Advanced_Programmable_Interrupt_Controller> on Mar. 20, 2017, 6 pages.

\* cited by examiner

DYNAMIC MICROSYSTEM RECONFIGURATION WITH COLLABORATIVE VERIFICATION

TECHNICAL FIELD

This disclosure pertains in general to system on a chip (SOC) technology. In particular, this disclosure pertains to methods and apparatus to enable SOCs to be dynamically reconfigured.

BACKGROUND

Some data processing systems (DPSs) include many different integrated circuits or "chips," with each chip serving a different purpose. For instance, a DPS may include one chip for a central processing unit (CPU), another chip for random access memory (RAM), another chip for read-only memory (ROM), another chip for a graphics processing unit (GPU), and many other chips for many other purposes. The control logic and other circuitry within a chip for any particular purpose may be referred to as a "subsystem," a "unit," etc. For instance, a CPU may include a control unit, an arithmetic logic unit (ALU), and many other units or subsystems.

One current trend is to expand the number of different functions that can be performed by a single chip. When a single chip includes all of the different systems or subsystems needed for a particular DPS, that chip may be referred to as a "system on a chip" or an "SOC" (or "SoC"). For instance, as recognized by the Wikipedia entry for "System on a chip," an SOC may contain "digital, analog, mixed-signal, and often radio-frequency functions—all on a single substrate." The different units or subsystems in an SOC may be referred to as "blocks." In particular, as explained by the Wikipedia entry for "Semiconductor intellectual property core," a semiconductor intellectual property (IP) block is "a reusable unit of logic, cell, or integrated circuit . . . layout design that is the intellectual property of one party." For purposes of this disclosure, a semiconductor IP block may be referred to simply as an "IP block" or a "block."

However, some SOCs are used in DPSs that also contain additional chips. Accordingly, such an SOC need do not contain all of the different systems or subsystems that are needed by such a DPS. If a chip contains multiple IP blocks (e.g., a microcontroller or a microprocessor, along with an advanced peripheral system such as a GPU), the chip may still be referred to as an SOC, even if the SOC is used in a DPS along with one or more additional chips.

DESCRIPTION OF EMBODIMENTS

Figure 1:
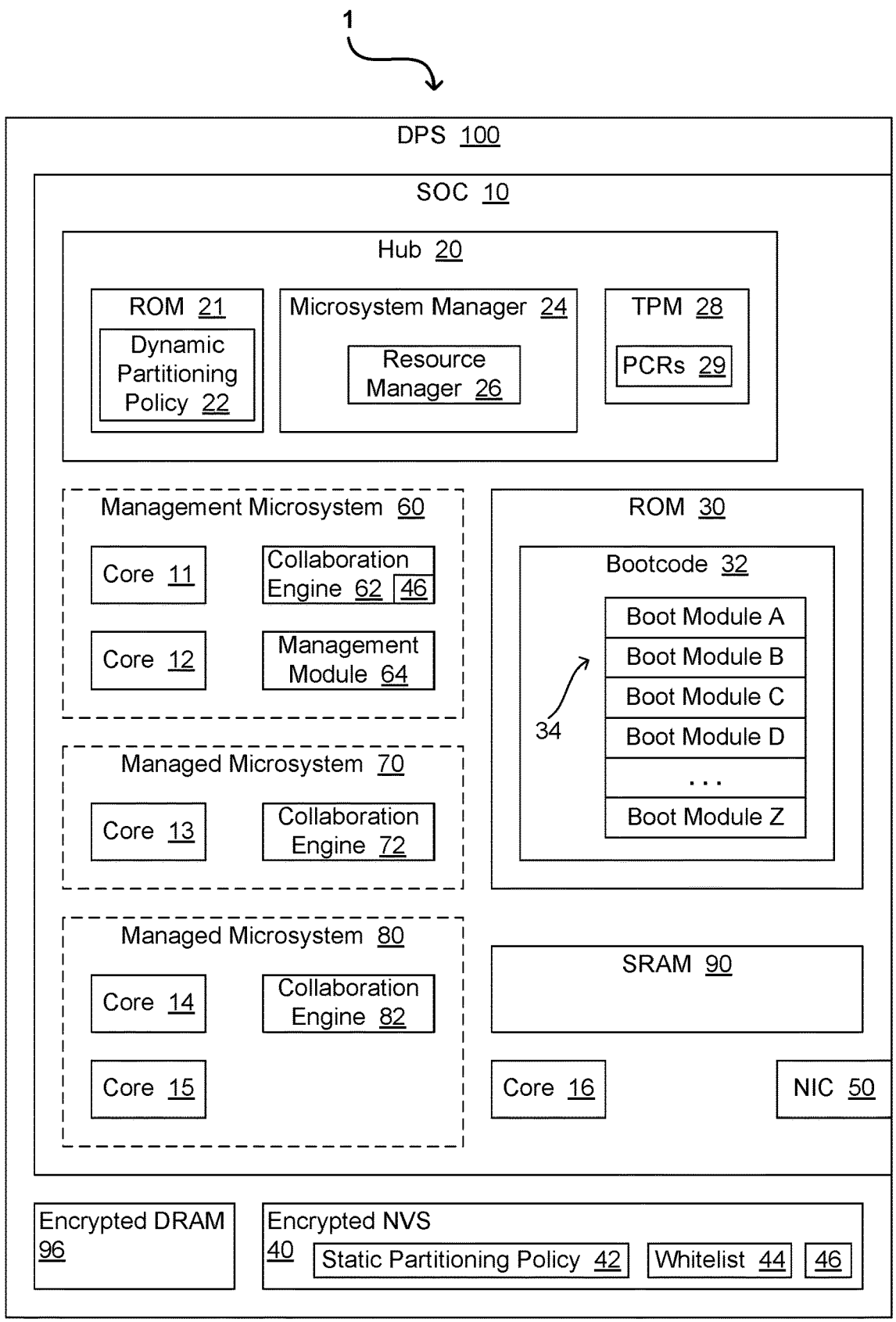
FIGS. 1 through 3 are block diagrams of an example embodiment of a DPS featuring an SOC with three different configurations in three different phases of operation.

A single-purpose SOC may be used in one particular type of DPS (e.g., in one particular smartphone model). Accordingly, a single-purpose SOC a may include a predetermined configuration of IP blocks, with that configuration hardwired or "baked in" to the SOC.

Alternatively, an SOC may have one or more elements that are configurable to a certain degree. A configurable SOC may also be referred to as a "programmable SOC" (PSOC). In particular, as indicated in the Wikipedia entry for "System on a chip," in a PSOC some elements are "not permanently defined and can be programmable in a manner analogous to" a field-programmable gate array (FPGA) or a complex programmable logic device (CPLD).

For instance, when a DPS with a conventional PSOC boots, the bootcode in the DPS (possibly including predetermined boot parameters) may dictate a certain configuration of features to be established during the boot process. The DPS subsequently uses that configuration when the DPS has finished booting. The operational configuration of the PSOC may thus be set during the boot process. Additionally, it may be impossible to change that configuration as long as the DPS remains operational. However, it may be possible to give the PSOC a new configuration by rebooting the DPS with different bootcode. For purposes of this disclosure, a PSOC that must be completely rebooted to realize a new operational configuration may be referred to as a "static PSOC."

The present disclosure, by contrast, pertains to an SOC that can be changed from one operational configuration to a different operational configuration without being completely rebooting. For purposes of this disclosure, the process for changing an SOC from one operational configuration to a different operational configuration without completely rebooting the SOC may be referred to as "dynamic reconfiguration." Likewise, an SOC that can be changed from one operational configuration to a different operational configuration without being completely rebooted may be referred to as a "dynamically reconfigurable SOC" (DRSOC).

Additionally, as described in greater detail below, the present disclosure involves a type of SOC that can support multiple relatively independent operating environments executing simultaneously. Each of those operating environments may include different IP blocks. For instance, each may include a different processing core. For purposes of this disclosure, such an operating environment within such an SOC may be referred to as a "microsystem." Thus, different blocks of an SOC may be assigned or allocated to different microsystems of that SOC. The "current configuration" of an SOC includes the microsystems that have been instantiated in that SOC, and the "current configuration" of a particular microsystem includes the blocks that have been assigned to that microsystem.

Furthermore, a DPS according to the present disclosure may provide for trusted boot and secure boot. For purposes of this disclosure, "trusted boot" refers to a boot process in which the boot modules that execute during the boot process are measured, and the measurements are saved for future reference—for example, to verify that the boot process executed a particular set of boot modules. Also, for purposes of this disclosure, "secure boot" refers to a boot process in which measurement for each boot module are verified during the boot process, with normal completion happening only if all of the measurements are good. For instance, as indicated in the Wikipedia entry for the "Unified Extensible Firmware Interface" (UEFI), the boot process may prevent "the loading of drivers or OS loaders that are not signed with an acceptable digital signature."

Figure 2:
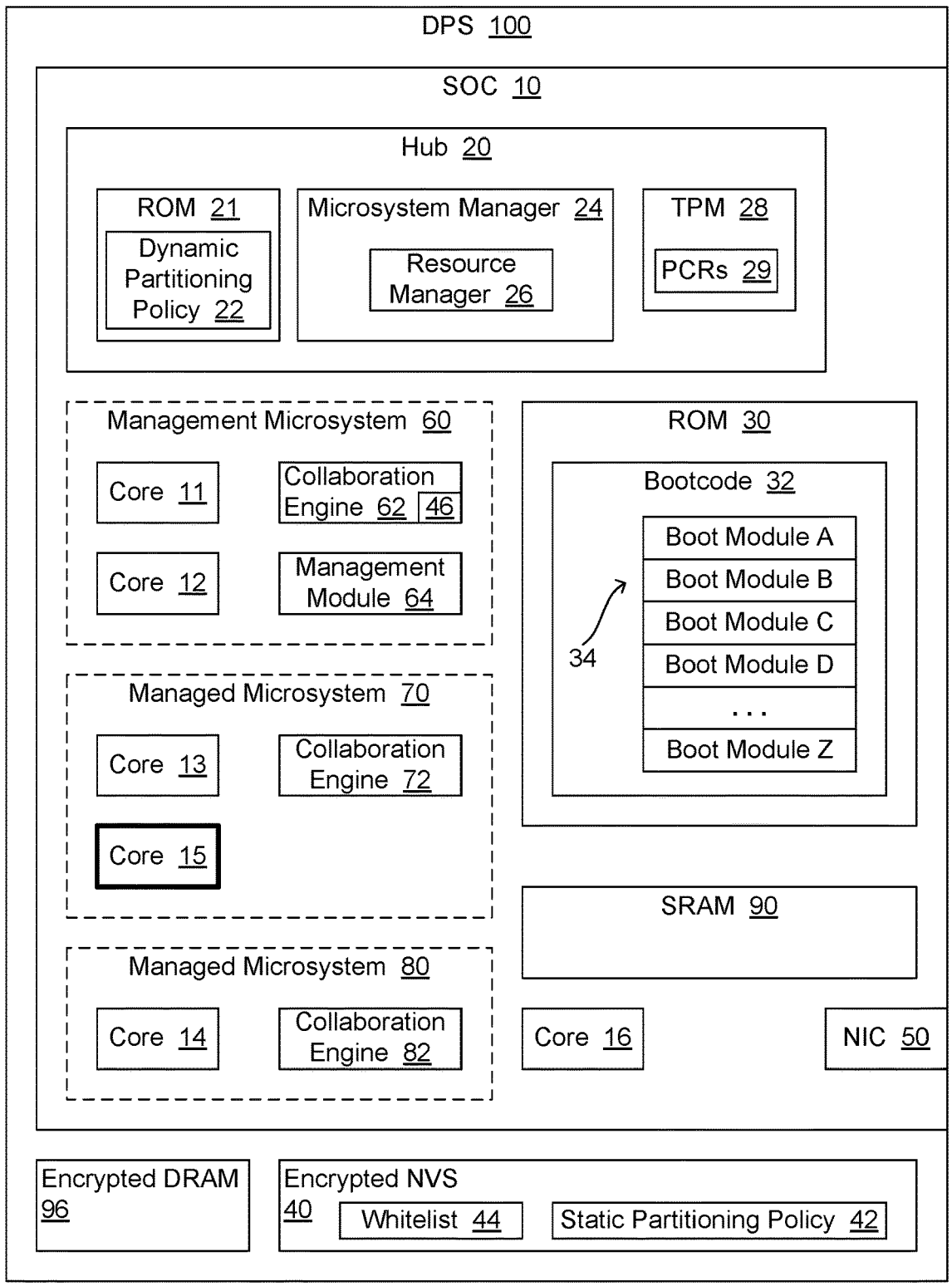
Figure 3:
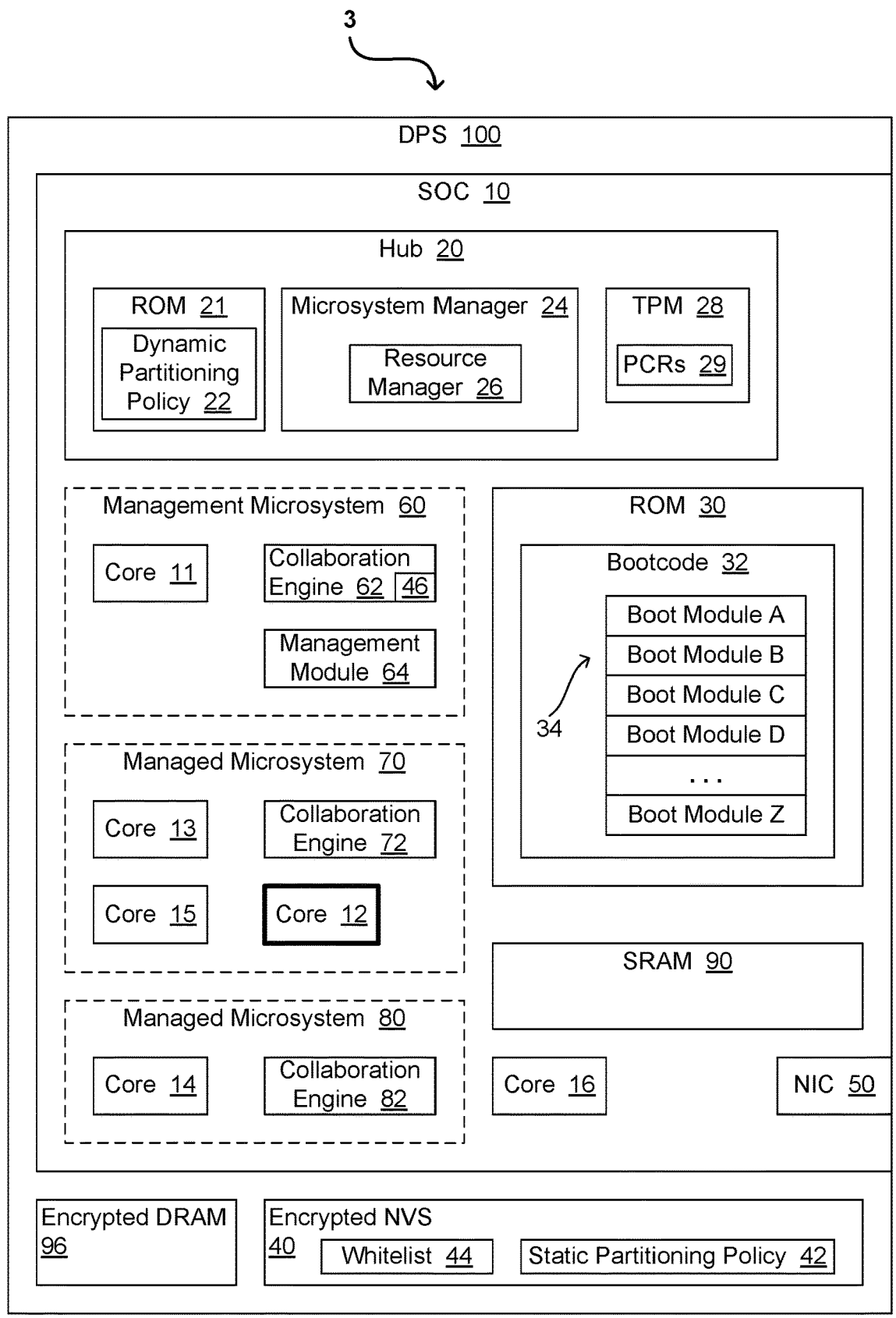

FIGS. 1 through 3 are block diagrams of an example embodiment of a DPS 100 featuring an SOC 10 with three different configurations in three different phases of operation. In particular, FIG. 1 depicts multiple microsystems on SOC 10, with those microsystems having an original configuration at the completion of a first phase. As indicated by reference number 1, this configuration may be referred as the "phase-1 configuration." Similarly, FIG. 2 depicts a second configuration at the completion of a first set of reconfiguration operations. As indicated by reference number 2, this configuration may be referred as the "phase-2 configuration." FIG. 3 depicts a third configuration at the completion of another set of reconfiguration operations. As indicated by reference number 3, this configuration may be referred as the "phase-3 configuration." As described in greater detail below, DPS 100 may realize the first configuration as part of a boot process, and DPS 100 may subsequently realize the second and third configurations without completely rebooting. In other words, as described in greater detail below, SOC 10 may be dynamically reconfigured from the phase-1 configuration to the phase-2 configuration, and then SOC 10 may be dynamically reconfigured from the phase-2 configuration to the phase-3 configuration.

As illustrated, in the embodiment of FIGS. 1 through 3, DPS 100 includes an SOC 10 and various off-chip components, such as dynamic RAM (DRAM) and nonvolatile storage (NVS). In particular, SOC 10 may use encryption technology to encrypt some or all information that leaves SOC 10. Accordingly, the off-chip RAM may be referred to as encrypted DRAM 96, and the off-chip NVS may be referred to as encrypted NVS 40.

SOC 10 includes multiple IP blocks, including a hub 20, ROM 30, static RAM (SRAM) 90, a network interface controller (NIC) 50, and multiple independent processing cores, illustrated as cores 11 through 16. In the illustrated embodiment, hub 20 is similar to a platform controller hub (PCH), and hub 20 includes a microcontroller that serves as a microsystem manager 24. Hub 20 also includes a trusted platform module (TPM) 28 which includes platform configuration registers (PCRs) 29. As described in greater detail below, PCRs 29 will reflect the sequence of boot modules that were executed to create the initial partitions. For example, boot modules may dynamically extend measurements into PCRs 29, as described in greater detail below. PCRs 29 may also reflect modified boot modules that were executed to create modified partitions.

In one embodiment, hub 20 is implemented as an embedded controller that has ROM 21 and application-specific integrated circuit (ASIC) logic for implementing microsystem manager 24, a resource manager 26, and TPM 28. In alternative embodiments, some subsystems (e.g., the TPM) may be implemented as independent IP blocks. As described in greater detail below, resource manager 26 runs on microsystem manager 24, and resource manager 26 includes control logic for applying partitioning policies to control the configuration and reconfiguration of SOC 10. In particular, in one embodiment, resource manager 26 uses a static partitioning policy (SPP) 42 to instantiate an original or default configuration, and resource manager 26 subsequently uses a dynamic partitioning policy (DPP) 22 to reconfigure SOC 10, as described in greater detail below.

ROM 30 includes bootcode 32, and bootcode 32 includes various individual boot modules 34, illustrated as boot modules A through Z. Boot module 34 may also be referred to as "bootstrap loaders" or "boot loaders," and as described below, boot modules 34 may operate as multiple-stage boot loaders. Also, as described in greater detail below, when DPS 100 boots, components such as bootcode 32, resource manager 26, SPP 42, DPP 22, and TPM 28 may cooperate to establish an initial or default configuration for SOC 10. That configuration may include two or more different partitions or microsystems. For the example illustrated in FIG. 1, the initial or default configuration includes a management microsystem 60 and two managed microsystems 70 and 80. As described in greater detail below, management microsystem 60 may then cooperate with resource manager 26 to determine whether and how to dynamically reconfigure SOC 10. Since microsystems 60, 70, and 80 can be dynamically reconfigured, FIGS. 1 through 3 illustrate each of microsystems 60, 70, and 70 with a dashed outline.

In one embodiment, a management console that operates outside of DPS 100 provisions DPS 100 with items such as SPP 42 and DPP 22 in advance of the boot process described below. The management console may also provision DPS 100 with other items, such as a whitelist 44 that contains known good measurements for each of boot modules A through Z. In one embodiment, NIC 50 includes technology to provide for remote out-of-band management (e.g., the technology provided by Intel Corporation under the name or trademark of "Intel® Active Management Technology" (AMT)), and the management console uses that technology to load data into DPS 100.

For items that the management console stores on-chip (i.e., within SOC 10), SOC 10 may provide security protections to prevent unauthorized entities from modifying the item. For each item that is stored off-chip, the management console may store that item in encrypted form. For instance, in one embodiment, the management console loads DPP 22 into ROM 21, and the management console loads SPP 42 and whitelist 44 into encrypted NVS 40. However, in other embodiments one or more of those items may be stored on different locations. For instance, the whitelist may be stored in the microsystem manager or in the TPM. For instance, NIC 50 may include remote management technology (e.g., Intel® AMT) which enables the management console to directly access components in hub 20 such as microsystem manager 24 and TPM 28.

As indicated above, in the embodiment of FIG. 1, resource manager 26 is implemented as software running on microsystem manager 24. Resource manager 26 may be one of the first execution entities to be created after reset. And soon after resource manager 26 is running, bootcode 32 may use resource manager 26 to instantiate appropriate initial partitions for SOC 10, based on the partitioning policies. In addition or alternatively, an SOC may execute a resource manager in a trusted execution environment (TEE) on a processor. For instance, the processor may use technology such as that provided by Intel Corporation under the name or trademark "Intel® Trusted Execution Technology" (TXT) to provide a TEE for the resource manager. In addition or alternatively, a processor may execute the resource manager in cache-as-RAM mode. Alternatively, a resource manager may execute in an FPGA unit, and that FPGA unit may have an integrated microcontroller, or a bitstream may be used to implement a microcontroller capability for the FPGA.

In the illustrated embodiment, each microsystem includes one or more processing cores, as well as a collaboration engine. In particular, according to an initial or default configuration, management microsystem 60 includes core 11, core 12, and collaboration engine 62; managed microsystem 70 includes core 13 and collaboration engine 72; and managed microsystem 80 includes core 14, core 15, and collaboration engine 82.

In another embodiment, the SOC may be configured with a management microsystem that includes one or more processing cores, a TPM, a collaboration engine, a resource manager, a DPP, and other components to enable the management microsystem to perform the operations described herein. For instance, the resource manager, the TPM, and the DPP may be hosted on one or more IP blocks that are co-resident with at least one of the processing cores and with the collaboration engine. For example, one or more of the IP blocks for the management microsystem may reside on hardware that serves as a system agent for a main CPU. Such a system agent may use technology such as that provided by Intel Corporation under the name or trademark "uncore." For instance, the main CPU may include components such as an ALU, an FPU, and L1 and L2 caches, and the system agent may include components such as one or more input/output (I/O) controllers, an L3 cache, a snoop agent pipeline, and a memory controller.

In one embodiment, some of boot modules 34 are designed to instantiate particular microsystems in SOC 10 with respective initial or default configurations. Specifically, boot modules B, C, and D are designed to instantiate microsystems 60, 70, and 80, respectively, with the configurations illustrated in FIG. 1. For instance, as described in greater detail below, when boot module A queries resource manager 26, resource manager 26 may identify boot module B as the next boot module. In response, boot module A may pass control to boot module B. And boot module B may then create management microsystem 60, allocating cores 11 and 12 and collaboration engine 62 to management microsystem 60. Alternatively, for microsystems and associated boot modules which are independent of each other, two or more boot module may execute in parallel.

In the illustrated embodiment, the configuration for management microsystem 60 also includes management module 64. Management module 64 may be implemented, for instance, as an embedded ASIC configured to perform tasks to manage reliability, availability, and serviceability (RAS), and management module 64 may include its own ROM for performing RAS functions. RAS functions may also be referred to as "manageability functions."

In one embodiment, at least some of boot modules 34 use microsystem manager 24 in hub 20 to allocate components to microsystems. For instance, boot module B may use microsystem manager 24 to allocate cores 11 and 12 and collaboration engine 62 to management microsystem 60. Similarly, boot module C may use microsystem manager 24 to allocate core 13 and collaboration engine 72 to management microsystem 70; and boot module D may use microsystem manager 24 to allocate cores 14 and 15 and collaboration engine 82 to management microsystem 80. Subsequently, while DPS 100 is running, management module 64 may use components such as microsystem manager 24, resource manager 26, SPP 42, DPP 22, and TPM 28 to dynamically reconfigure SOC 10, as described in greater detail below.

The collaboration engine in each microsystem includes control logic to enable that microsystem to participate in a blockchain system. This blockchain system may include each of the microsystems, with those microsystems cooperating to maintain a blockchain which documents or records some or all changes to the configuration of any of the microsystems. For instance, the collaboration engine in each microsystem may use the blockchain to verify that assignment of cores or other resources are atomic and not duplicated. In addition, collaboration engines may be used to verify and log configurations when establishing communication between the microsystems at runtime. Such verification and logging may be beneficial for collaboration across or among microsystems.

The blockchain may follow any suitable protocol, including without limitation protocols known by the following names or trademarks: "Etherium," "Bitcoin," and "Hyperledger Project." Also, any suitable technology may be used to implement a collaboration engine, including without limitation a dedicated ASIC; an FPGA bitstream; an embedded microcontroller (e.g., like one of the microcontrollers provided by Intel Corporation under the name or trademark "Converged Security and Manageability Engine" (CSME)); or software running on a general purpose core. In addition or alternatively, a microsystem may use virtual partitioning (e.g., based on the technology provided by Intel Corporation under the name or trademark "Intel® Virtualization Technology" or "VT-x") to execute a collaboration engine within a virtual machine (VM).

In a conventional boot process, such as a boot process that follows the trusted computing specifications provided by the Trusted Computing Group, the boot sequence is determined by Advanced Configuration and Power Interface (ACPI) entries and bootstrap loader code. Thus, in a conventional boot process, the first boot loader is embedded with a policy that describes which code to load next, and execution transfers to the next loader, and this process is repeated until the system has booted. Consequently, it may be necessary to modify the bootcode and reboot the entire system to change the configuration of a conventional PSOC.

FIGS. 4A through 4D present a flowchart of an example embodiment of a process for dynamically reconfiguring SOC 10 in DPS 100. For purposes of illustration, this example process is discussed in connection with the booting of DPS 100 to a phase-1 configuration and in connection with subsequent operations to dynamically reconfigure DPS 100 to the phase-2 and phase-3 configurations. Accordingly, FIG. 4A starts with DPS 100 booting, for instance after being turned on or reset. As describe in greater detail below, resource manager 26 may then apply SPP 42 and DPP 22 to the boot control path. Thus, unlike a conventional process, the process of FIGS. 4A through 4D involves the cooperation of bootcode 32 and resource manager 26, in conjunction with SPP 42 and DPP 22. For instance, resource manager 26 may read SPP 42 and DPP 22 to determine the sequence of boot modules to be loaded and executed.

Figure 4A:
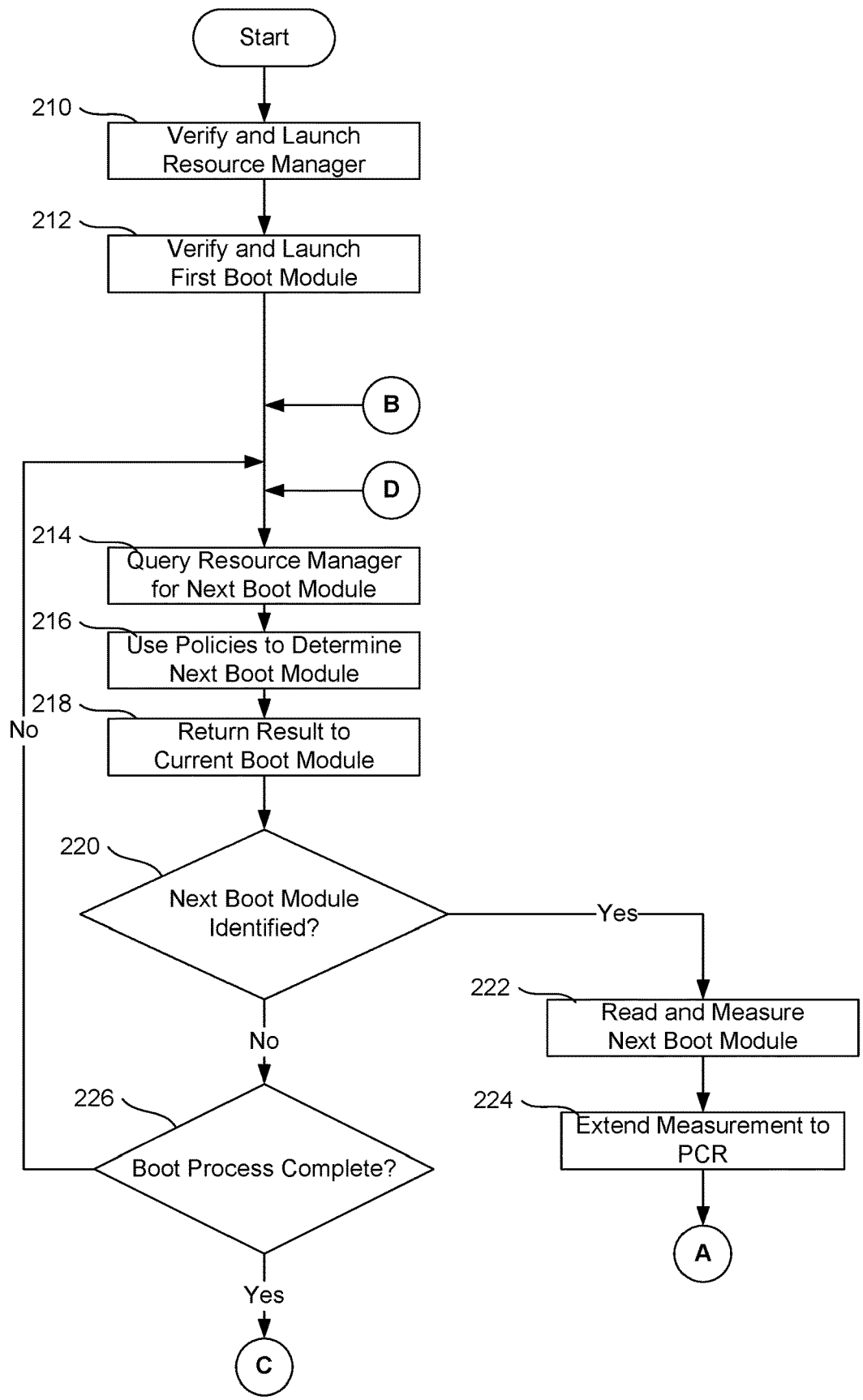
FIGS. 4A through 4D present a flowchart of an example embodiment of a process for dynamically reconfiguring the SOC of FIGS. 1 through 3.

In particular, as shown at block 210 of FIG. 4A, the boot process may start with microsystem manager 24 verifying and launching resource manager 26, for instance in response to a power on self-test (POST) signal produced when DPS 100 is started or reset. In one embodiment, resource manager 26 is implemented as embedded code that microsystem manager 24 reads from ROM in hub 20. Microsystem manager 24 may then measure and verify resource manager 26, or resource manager 26 may measure itself and use that measurement to verify itself. Accordingly, microsystem manager 24 or resource manager 26 may serve as a root of trust for measurement (RTM). Subsequently, as shown at block 212, a default boot processor (e.g., core 11) may verify and launch a first boot module 34 (e.g., boot module A). For instance, microsystem manager 24 may send a POST signal to core 11, and core 11 may respond by executing a POST and then reading boot module A from ROM 30, measuring boot module A, verifying boot module A, loading boot module into encrypted DRAM 96, and allowing boot module A to execute. Alternatively, microsystem manager 24 may read boot module A from ROM 30, verify it, and load it into core 11. Boot module A may also perform various preliminary boot operations, such as discovering hardware components (e.g., cores 12-15, management module 64, etc.), initializing hardware components, etc. In one embodiment, boot module A measures itself and uses that measurement to verify itself, based on a known good measurement from whitelist 44. Furthermore, any bootcode that executes before the collaboration engines are active may be saved in a PCR, and that PCR value can be given to collaboration engine 62 for peer validation.

When boot module A executes, a first portion of that code may perform a POST to ensure the core is operational. A second portion of the code may then access special address ranges that are memory mapped to the other engines such as collaboration engine 62 and management module 64. For instance, the second portion of boot module A may load a third portion of boot module A into collaboration engine 62 and a fourth portion into management module 64. The third portion may then perform POST and enumeration for collaboration engine, and the fourth portion may perform POST and enumeration for management module 64. Also, other portions of boot module A may perform POST and enumeration for other engines or controllers, such as collaboration engines 72 and 82.

However, in another embodiment, instead of using a single boot module A to hold the code for all of the operations discussed above, a DPS may use a set of two or more different boot modules to perform those operations. Likewise, instead of using a single boot module B to boot a management microsystem or a single boot module C to boot a managed microsystem (as described below), a DPS may use a set of two or more different boot modules to boot each microsystem. Also, in one embodiment, a microsystem manager independently boots various components for a management microsystem (e.g., a core, a collaboration engine, and a management module. In another embodiment, a microsystem manager boots a first component (e.g., a collaboration engine), and then passes control to that component, which then boots one or more other components (e.g., a management module and a core).

Whenever a different module is loaded, to provide for trusted boot, a measurement of each module is extended into a TPM PCR; and to provide for secure boot, the code that is performing the measurement reads a whitelist to find a measurement that matches the measurement just taken. If a match is found, then boot execution continues. If a match is not found, then one of several possible actions may be applied. For instance, the boot process may be halted with some sort of notification sent to the management console to suggest that either the whitelist or the boot module should be updated.

Referring again to FIG. 4A, after boot module A and resource manager 26 have been launched, the currently executing boot module (in this case, boot module A) then queries resource manager 26 to determine which boot module should be executed next, as shown at block 214. As shown at block 216, resource manager 26 then consults SPP 42 or DPP 22 to determine which boot module should be executed next, based on those policies and the current state of SOC 10. In particular, resource manager 26 generally uses SPP 42 for the initial boot process to establish the default configuration illustrated in FIG. 1, and resource manager 26 generally uses DPP 22 when a microsystem is being dynamically reconfigured. However, resource manager 26 may consider both SPP 42 and DPP 22 for the initial configuration and for dynamic reconfiguration. Also, those policies may cause specific boot modules to instantiate respective microsystems. For instance, SPP 42 may cause boot module B to instantiate management microsystem 60, boot module C to instantiate managed microsystem 70, and boot module D to instantiate managed microsystem 80, as described in greater detail below. In one embodiment, the boot module for each microsystem executes on a core for that microsystem. For instance, boot module A may cause boot module B to run on core 11, boot module B may cause boot module C to run on core 13, and boot module C may cause boot module D to run on core 14.

In one embodiment, SPP 42 prescribes a default or initial profile for each microsystem. SPP 42 may be set and modified by a system administrator, for example. For instance, for one deployment environment, the administrator may configure SPP 42 to allocate the resources to the microsystems as shown in FIG. 1. And the SPP may be configured differently for different deployment environments. For instance, one SPP may configure all microsystems be the same (e.g., where each microsystem receives two cores, in a system consisting of six cores and three microsystems). Another SPP may optimize for lightweight workloads such as email messaging where each microsystem receives a single core, and some cores remain initially unassigned. Another SPP may optimize for deep-learning analytics with a maximum of cores distributed across a minimum of microsystems (e.g., with six cores assigned to a single microsystem). Thus, a system may be configured with an SPP that best suits the deployment environment.

By contrast, DPP 22 may provide for changes to the initial or default state. For instance, DPP 22 may provide for reallocation of resources among microsystems as described herein with regard to FIGS. 2-3 and 4A-4D. Different particular systems may be configured with different DPPs, with each system having a DPP that best suits the deployment environment of that system. For instance, a deployment environment that supports reconfiguration to provide a query-optimized database may use a DPP that provides a "star schema" profile, where a main microsystem is configured with approximately half of the available cores, and each of the remaining "satellite" microsystems receives a single core. Such a satellite microsystem may operate on a simple 2-tuple index for query, while the main microsystem performs database merge and update operations affecting all database dimensions, for example. Additionally, DPP 22 may prescribe different types of reallocations based on monitored conditions of one or more of the microsystems. For example, DPP 22 may prescribe numerous different sets of approved configurations, including one set that matches the configuration of FIG. 1, another set that matches the configuration of FIG. 2, another set that matches the configuration of FIG. 3, and many other approved configurations. For purposes of this disclosure, the data that prescribes approved configurations may be referred to as "approved configuration data." Additionally, DPP 22 may prescribe many different sets of conditions under which DPS 100 should switch from one of the prescribed configurations to another. For purposes of this disclosure, the data that prescribes the conditions that should trigger dynamic reconfiguration may be referred to as "reconfiguration rules." For instance, the reconfiguration rules may specify that SOC 10 should be changed from the configuration of FIG. 1 to the configuration of FIG. 2 when core 13 in managed microsystem 70 is exceeding a first predetermined usage threshold and core 15 in managed microsystem 80 is not exceed exceeding a second predetermined usage threshold. In addition, as described in greater detail below, management module 64 may update DPP 22 with data to identify specific microsystems to be rebooted during the process of adopting a new configuration. For purposes of this disclosure, that data may be referred to as "new configuration settings."

Referring again to FIG. 4A, after the current boot module has queried resource manager 26, resource manager 26 then notifies the current boot module which boot module should be executed next, shown at block 218. Or, if no more boot modules need to be executed, resource manager 26 may indicate so to the current boot module. As shown at block 220, the current boot module then determines whether resource manager 26 has identified a next boot module to be executed. If a next boot module had been identified, the current boot module then reads and measures that next boot module, as shown at block 222. As shown at block 224, for trusted boot, the current boot module may then extend that measurement into PCRs 29. The process may then pass through page connector A to FIG. 4B.

As described in greater detail below, if DPS 100 is configured to use trusted boot and not secure boot, after the current boot module applies trusted boot semantics (e.g., writing measurements to PCRs 29), the process may flow through the "no" branches of blocks 230 and 250 to block 252.

Moreover, the current boot module may provide for independent verification of the next boot module, collaborative verification, or both. For instance, as shown at block 230, the current boot module may determine whether independent measurement verification is required. For instance, the current boot module may check SPP 42 or DPP 22 to determine if independent verification is required. Alternatively, for instance if a current boot module does not have access to the SPP or the DPP, the boot module may be hardcoded with a specific policy indicating whether or not independent verification, collaborative verification, or both are required. If independent verification is required, the current boot module may check whitelist 44 to verify whether the measurement is good, as shown at block 240.

As indicated above, whitelist 44 may include predetermined, known good measurements for each of boot modules 34. Additionally, whitelist 44 may contain known good measurements for multiple different versions for each boot module. For instance, whitelist 44 may contain measurements for versions of boot modules designed to instantiate each of the different microsystem configurations illustrated in FIGS. 1 through 3.

In one embodiment, resource manager 26 uses SPP 42 to direct the pairing of each boot module with a corresponding entry in whitelist 44 and to cause the measurement of that boot module to be stored in a corresponding PCR. For instance, resource manager 26 may use a specific offset into bootcode 32 and corresponding offsets into whitelist 44 and into PCR resources for each boot module. SPP 42 may prescribe those offsets as part of a partitioning policy description for the microsystems being booted. SPP 42 may thus provide for the alignment of components within bootcode 32, whitelist 44, and PCRs 29.

Referring again to block 240, if the current boot module determines that the measurement of the next boot module is not valid or not authorized (e.g., if the measurement does not match a known good measurement), instead of loading and executing the boot module with the bad measurement, the current boot module may report an error condition, as shown at block 244. The process may then pass through page connector B to block 214 of FIG. 4A, with the current boot module querying resource manager 26 for another next boot module, without executing the boot module with the bad measurement. That next boot module may be referred to as a new next boot module. As described above and below, the current boot module may then proceed to read and verify the new next boot module.

Figure 4B:
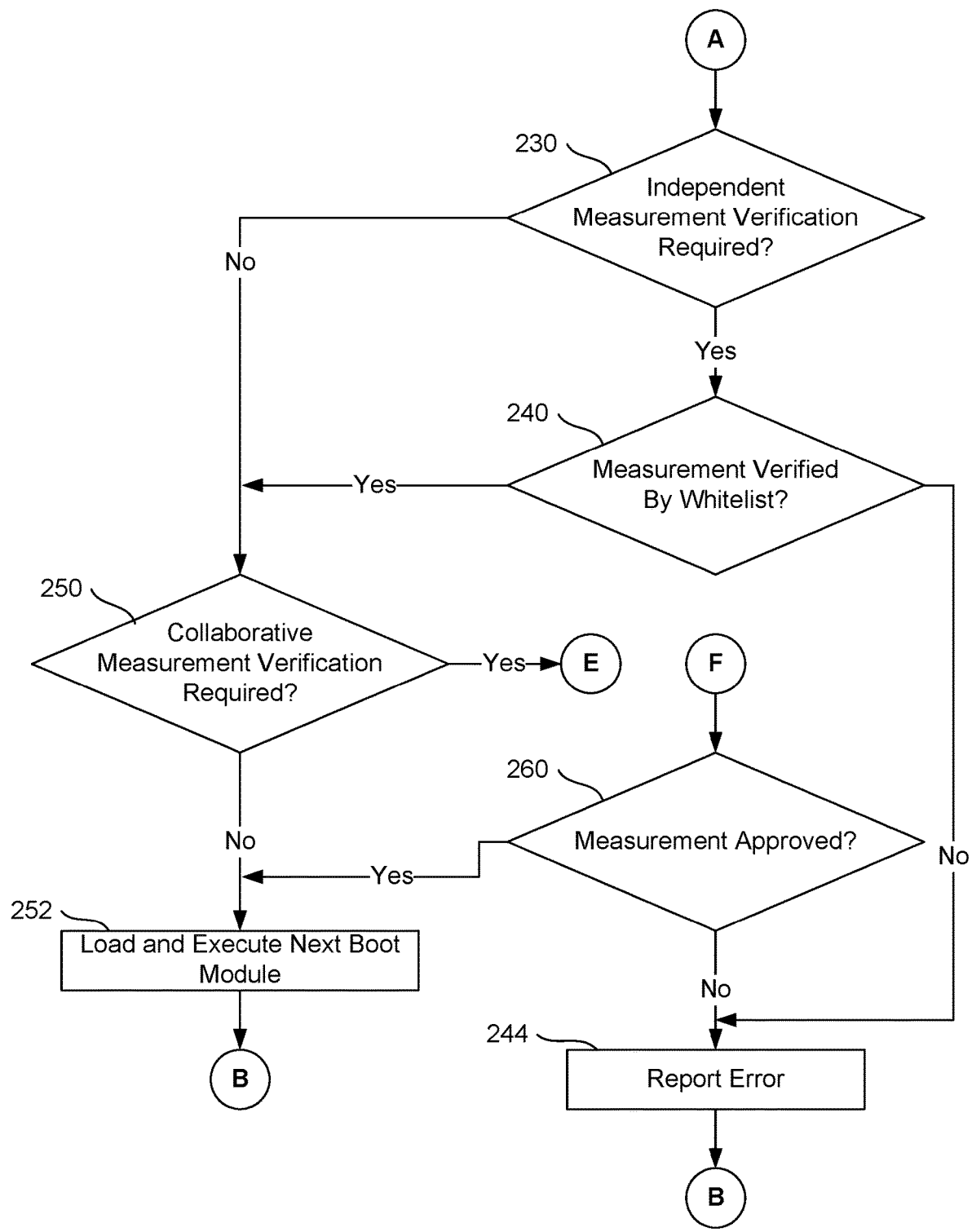
Figure 4C:
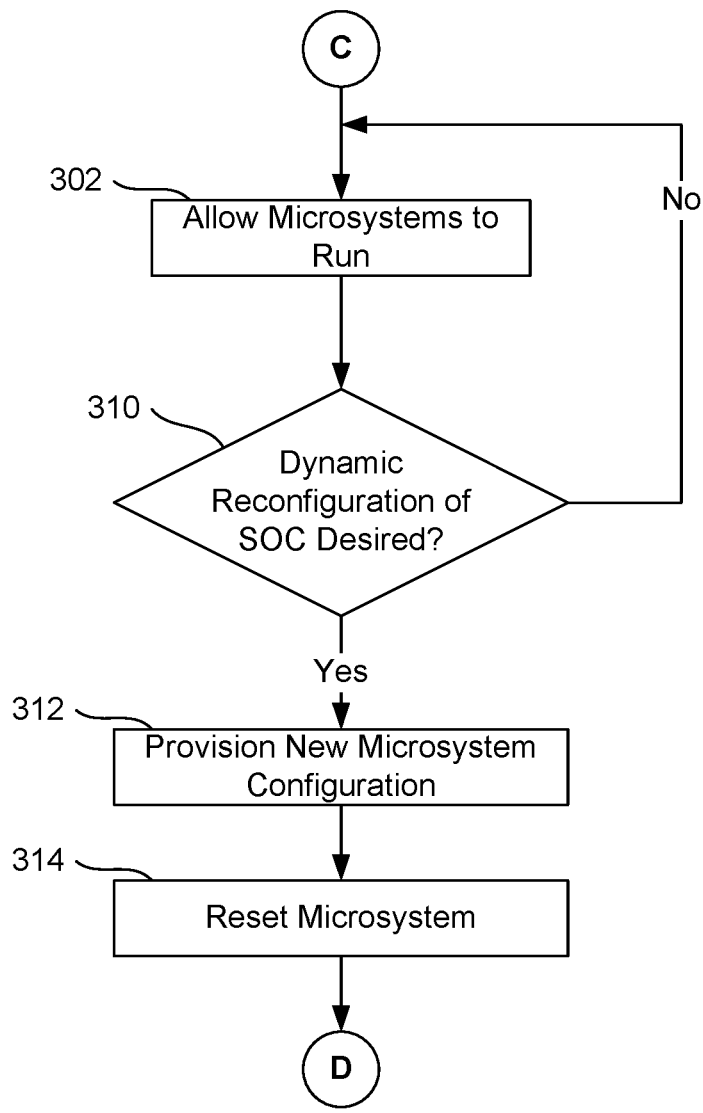

However, referring again to block 240 of FIG. 4B, if the measurement is good, the current boot module may then determine whether collaborative verification is required, as shown at block 250. For instance, the current boot module may check SPP 42 or DPP 22 to determine if collaborative verification is required. Alternatively, as indicated above, a boot module may be hard coded with a specific policy indicating whether or not collaborative verification is required.

In one embodiment, DPS 100 boots collaboration engines 62, 72 and 82 early in the boot process, and each collaboration engine is an embedded controller that can perform collaborative verification independently of the operational state of most other parts of SoC 10. For instance, a collaboration engine may only need microsystem manager 24 (a) to signal POST, (b) to send commands to the collaboration engine, and (c) to be able to handle interrupts generated by the collaboration engine. In another embodiment collaborative verification can be sequential (if needed) to boot the system in stages, when those stages have dependency. In another embodiment, the SOC is configured to use collaborative verification only after the DPS has completed a first boot process to instantiate the various microsystems with their default configurations. Accordingly, a DPS may be configured to require collaborative verification for any dynamic reconfiguration of its SOC.

If collaborative verification is not currently required, the current boot module may load and execute the next boot module, as shown at block 252. The process may then return to block 214 of FIG. 4A via page connector B, with the boot module that was just launched serving as the current boot module.

Thus, during the initial boot process, boot module A may verify boot module B, and boot module B may then execute to instantiate management microsystem 60, for example. Boot module B may then use the same process to verify and launch boot module C. Boot module C may then execute to instantiate managed microsystem 70, for example. And boot module C may then verify and launch boot module D. Boot module D may then execute to instantiate managed microsystem 80.

However, when boot module D gets to block 220 of FIG. 4A, resource manager 26 may indicate that there are no more boot modules to execute. As shown at block 226, boot module D may then determine whether the initial boot process is complete. If so, the process may then pass through page connector C to FIG. 4C. As shown at block 302, DPS 100 may then allow the various microsystems to run. Thus, as a result of the illustrated boot process, SOC 10 may be configured with microsystem 60, microsystem 70, and microsystem 80, as shown in FIG. 1.

Subsequently, as shown at block 310, while the various microsystems are running, management module 64 may occasionally determine whether dynamic reconfiguration of SOC 10 is desired. For instance, management module 64 may communicate with microsystem manager 24 to perform manageability functions, and based on those communications, management module 64 may automatically determine that dynamic reconfiguration is desired in response to detecting certain conditions. For instance, management module 64 may monitor processing and determine for example when core, memory or I/O are over capacity; and management module 64 may respond by requesting reconfiguration by microsystem manager 24. Thus, microsystem manager 24 may operate as master and management module 64 may operate as slave. Although some RAS functions may use embedded code to automatically perform certain hot-swap operations, other reconfiguration operations may be driven by micro system manager 24 and management module 64.

If dynamic reconfiguration is not desired, DPS 100 may continue to operate without changing the configuration of SOC 10. However, if dynamic reconfiguration is desired, management module 64 may specify a new configuration for one or more microsystems, as shown at block 312. For instance, when DPS 100 is running with the phase-1 configuration (as shown in FIG. 1), if management module 64 determines that managed microsystem 70 is overworking core 13 and managed microsystem 80 does not need core 15, management module 64 may determine (at block 310 of FIG. 4C) that SOC 10 should be reconfigured to the phase-2 configuration (as shown in FIG. 2). And at block 312, management module 64 may modify DPP 22 with new configuration settings which (a) identify managed microsystems 70 and 80 as needing to be reset and (b) identify the corresponding boot modules (e.g., boot modules C and D) as needing to be executed after the specified microsystems are reset.

Additionally, management module 64 may modify one or more of boot modules 34 to provide for new microsystem configurations the next time those boot modules execute. For instance, in the above scenario, management module 64 may modify boot modules C and D to reallocate core 15 to managed microsystem 70 instead of managed microsystem 80.

As shown at block 314, management module 64 may then reset the micro system or microsystems that are to be reconfigured. For instance, management module 64 may instruct microsystem manager 24 to reset the microsystems identified in the new configuration settings in DPP 22, and in response microsystem manager 24 may send a reset signal to a primary core for each of those microsystems. For example, the reset signal may signal a POST action using a particular pin (e.g., pin 2) of each core to be reset. Each core may respond to that post signal by automatically trying to boot. For purposes of this disclosure, a boot module that has been modified to provide a microsystem with a modified configuration may be referred to as a "reconfiguration boot module."

However, when microsystem manager 24 resets the specified microsystem or microsystems, microsystem manager 24 may leave at least one other microsystem in SOC 10 running. For purposes of this disclosure, the process or operations of resetting at least one microsystem in an SOC while allowing at least one other microsystem in the SOC to continue running may be referred to as a "partial reset."

Referring again to block 314, after the relevant microsystem (or microsystems) has been reset, the process may then pass through page connector D to block 214 of FIG. 4A. Microsystem manager 24 may then perform some or all of the operations described above as being performed by the current boot module. Accordingly, microsystem manager 24 may be considered to be serving as a "current boot module" when microsystems are reset for dynamic reconfiguration For instance, as shown at block 214, microsystem manager 24 may query resource manager 26 to determine which boot module should be executed next. For example, microsystem manager 24 may query resource manager 26 in response to detecting that DPP 22 has been updated.

In one embodiment, once DPS 100 has booted, resource manager 26 maintains a list of running microsystems so it knows not to reboot an already running system. In addition, as indicated above, DPP 22 may identify which microsystems are being reset. Consequently, when resource manager 26 uses policies to determine the next boot module, as shown at block 216, resource manager 26 may consider the next boot module(s) to be the boot module(s) for the microsystem(s) that is being reset. For instance, as the process loops around, resource manager 26 may proceed sequentially through the boot code list, starting with the boot module for the first microsystem that is being reset and ending with the boot module for the last microsystem that is being reset, and skipping boot modules for any microsystems that were not reset. As shown at block 218, resource manager 26 may return the result to microsystem manager 24.

If a next boot module has been identified, microsystem manager 24 may read and measure the next boot module, and may extend the measurement to a PCR, as shown at blocks 220, 222, and 224. The process may then pass through page connector A, and microsystem manager 24 may provide for independent measurement verification, collaborative verification, or both. For instance, microsystem manager 24 may perform independent verification, as shown at blocks 230 and 240. And when the process reaches block 250, microsystem manager 24 may conclude that collaborative verification is required. The process may then pass through page connector E to FIG. 4D.

Figure 4D:
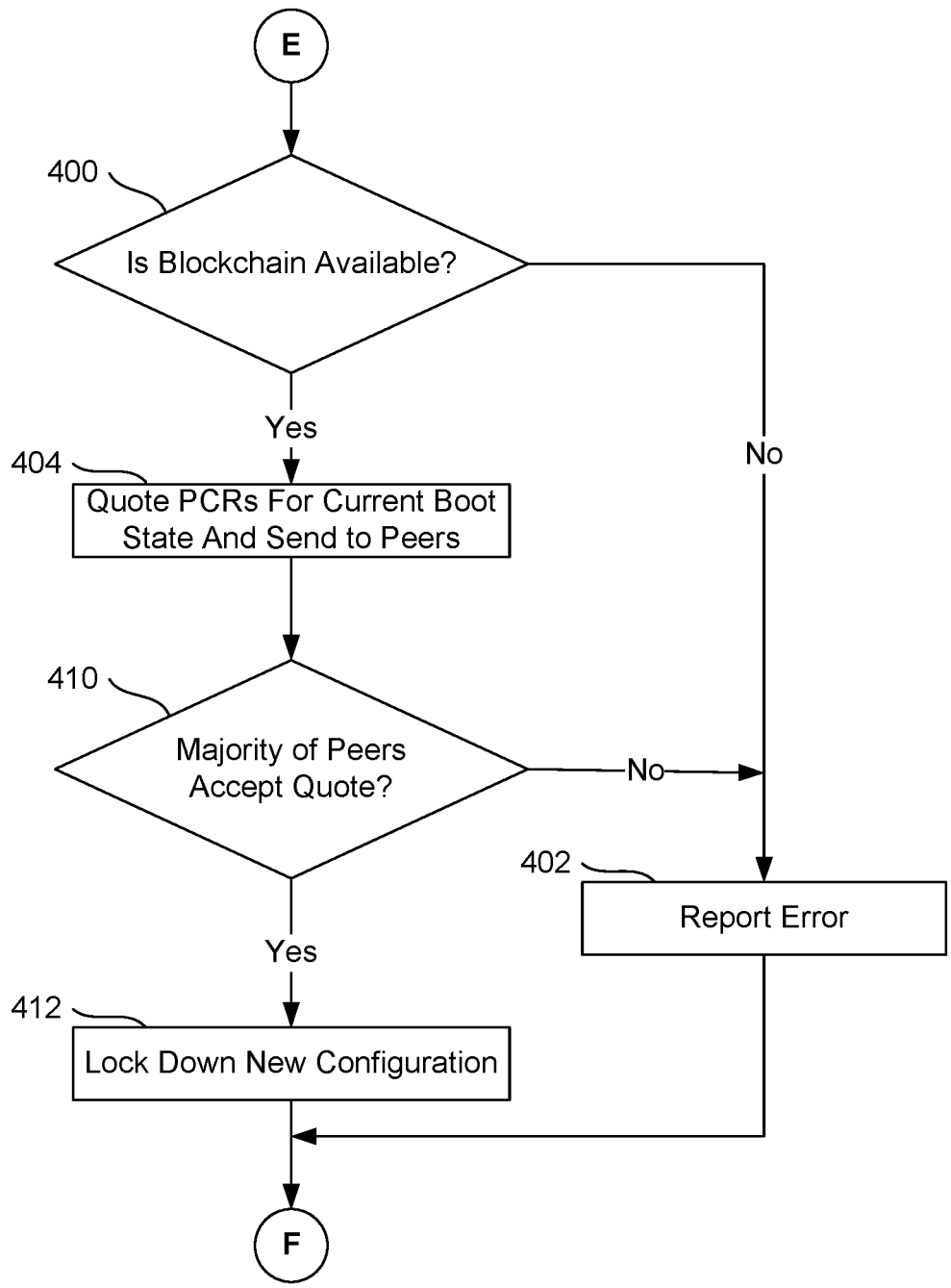

Microsystem manager 24 may proceed through the collaborative verification process illustrated in FIG. 4D, in response to a partial reset intended to dynamically reconfigure SOC 10. Microsystem manager 24 may be capable of providing for collaborative verification and other management services. For instance, as indicated above, microsystem manager 24 may include a collaboration engine with a CVB, etc. In addition, that collaborative verification process may be used by a current boot module (a) when DPS 100 is performing a complete boot or (b) after microsystem manager 24 has loaded a first boot module after a partial reset.

In particular, a current boot module may send a request to management module 64 to get management microsystem 60 to handle the collaborative verification process. Consequently, the operations of FIG. 4D are described below as being performed by management module 64. However, when management microsystem 60 has been reset, the management services typically provided by management microsystem 60 may revert to microsystem manager 24. In addition or alternatively, a management module and a microsystem manager may share roles. Accordingly, it should be understood that the operations that are described below as being performed by management module 64 or by the current boot module may instead be performed by microsystem manager 24 when necessary. Similarly, it should be understood that operations that are normally performed by a current boot module (such as those illustrated in blocks 214, 220, 222, 224, and 226 of FIG. 4A, as well as those illustrated in FIGS. 4B and 4E), may be performed by microsystem manager 24 in response to a partial reset.

As shown at block 400, management module 64 may determine whether a collaborative verification blockchain (CVB) 46 is available. In one embodiment, each collaboration engine maintains a copy of CVB 46, adding a new block to CVB 46 whenever the collaboration engine verifies a boot module measurement and whenever a new configuration is locked down because a majority of collaboration engines have agreed that the measurement of that configuration is good. Additionally, each collaboration engine may be provisioned with a genesis block in advance of the boot process. If no CVB is available, management module 64 may respond by performing an action based on an error policy. For instance, as shown at block 402, management module 64 may report a corresponding error, as shown at block 402.

Alternatively, the error policy may cause management module 64 to stop booting or to take any other appropriate action. After management module 64 has applied the error policy, the process may then pass through page connector F to FIG. 4B. The current boot module may then determine that the measurement was not approved, as shown at block 260, and may report a corresponding error, as shown at block 244.

However, referring again to block 400 of FIG. 4D, if CVB 46 is available, management module 64 may then obtain a PCR quotation (or "quote") for the current boot state and send that quote to the peer microsystems, as shown at block 404. And since the measurement for the next boot module has already been extended to PCRs 29 (as per block 224 of FIG. 4A), the measurement for the "current boot state" includes a measurement for the next boot module. As shown at block 410, management module 64 may then determine whether a majority of the peers have accepted the quote. As described in greater detail below, each microsystem may use a process like the one illustrated in FIG. 5 to evaluate such quotes.

If a majority of peers do not accept the quote, management module 64 may report a corresponding error, as shown at block 402. However, if a majority of peers accepts the quote, management module 64 may lock down the new configuration, as shown at block 412. In one embodiment, the collaboration engines use a blockchain consensus algorithm, in which each peer notifies all other peers regarding the expected hash of the block to be added to the blockchain. If a majority of peers gets the same block hash value, then the block is added to the chain of blocks. Each peer maintains its own copy of the chain of blocks. The consensus agreement protocol is a synchronization ("sync") protocol which ensures that each collaboration engine eventually ends up with the same entries in its copy of CVB 46. Accordingly, to lock down a configuration that has been verified by a majority of collaboration engines, management module 64 may send a "sync" message to all of the collaboration engines confirming that the verified configuration should be reflected in CVB 46 of all of the collaboration engines. In addition, management module 64 may save a copy of CVB 46 to encrypted NVS 40.

After the new configuration has been locked down or an error reported, the process may then pass to block 260 of FIG. 4B via page connector B. If the measurement for the next boot module was verified by a majority of peers, the current boot module may then load and execute that next boot module, as shown at block 252. But if the measurement was not verified by a majority of peers, the current boot module may report a corresponding error, as shown at block 244.

The operations described above may then be repeated as necessary to provide for further reconfigurations as necessary. Thus, the boot process described above provides a very flexible mechanism for establishing different microsystems with different initial configurations, and for dynamically changing those configurations. Consequently, the IP architecture of SOC 10 is very flexible.

In different embodiments, the various different policies may be organized using any suitable groupings and stored in any suitable location. For instance, a boot-specific policy may be used to specify the expected boot behavior and a partitioning-specific policy may be used to specify the expected configuration of resources for multiple configurable microsystems within an SOC. Similarly, the SPP may be statically defined as part of ROM 30.

Figure 5:
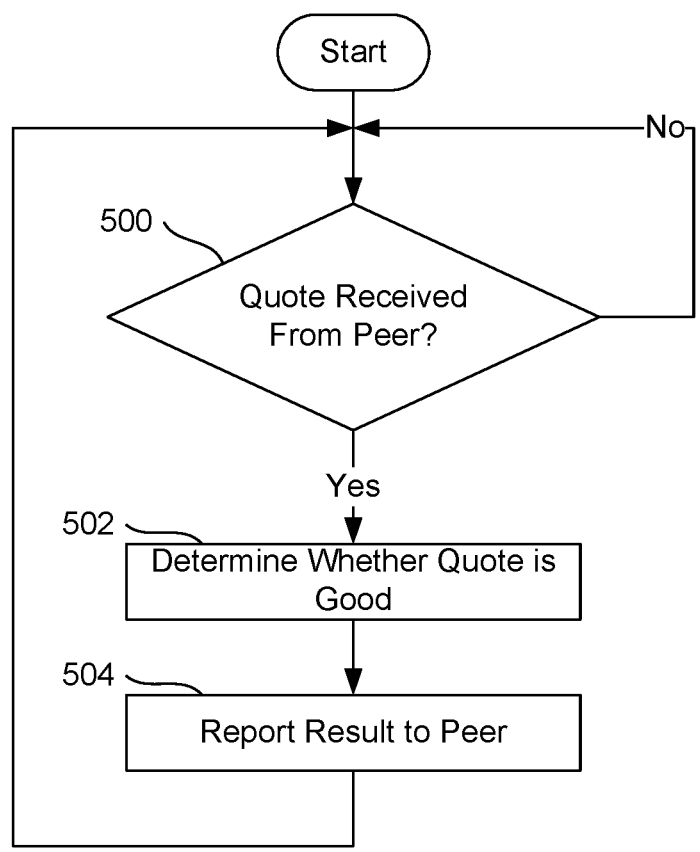
FIG. 5 presents a flowchart of an example embodiment of a process for using a blockchain to collaboratively validate microsystem configurations.

FIG. 5 presents a flowchart of an example embodiment of a process for using a blockchain to collaboratively validate microsystem configurations. The process may start with a collaboration engine (e.g., collaboration engine 82) periodically or occasionally determining whether it has received a quote from a peer. For instance, collaboration engine 62 may send a quote to collaboration engines 72 and 82 at block 404 of FIG. 4D. And as indicate above, the quote may include a measurement for a next boot module. If the collaboration engine has received a quote, the collaboration engine may then determine whether the quote is good, as shown at block 502. For instance, as indicated above, the collaboration engine may check whitelist 44 for a matching measurement. As shown at block 504, the collaboration engine may then report the result to the peer that sent the quote. The process may then return to block 500, with the process of FIG. 5 repeated for subsequent quotes.

Also, as shown at block 410 of FIG. 4D, after the collaboration engine of FIG. 5 reports the result to collaboration engine 62 (for example), collaboration engine 62 may then determine whether a majority of peers has accepted the quote. As indicate above, collaboration engine 62 may then proceed to lock down the new configuration, and management module 64 may then either launch the next boot module or report an error, depending on whether the quote was approved.

As has been described, management module 64 and microsystem manager 24 may convert SOC 10 from the phase-1 configuration of FIG. 1 to the phase-2 configuration of FIG. 2 by deallocating core 15 from managed microsystem 80 and then allocating core 15 to managed microsystem 70. Also, management module 64 and microsystem manager 24 may subsequently convert SOC 10 from the phase-2 configuration of FIG. 2 to the phase-3 configuration of FIG. 3 by deallocating core 12 from management microsystem 60 and then allocating core 12 to managed microsystem 70. Moreover, management microsystem 60 may dynamically apply those changes without rebooting DPS 10.

Isolation is one of the main mechanisms used to ensure that software executes as intended without interference from other entities and without exceeding its own boundaries. The illustrated process provides a strong, simple, and low-overhead method to provide system-like isolations within a complex SOC that contains many cores, subsystems, etc. The present teachings may provide significant benefits, relative to conventional approaches to isolation, including approaches which rely on software-based partitioning methods such as using a hypervisor or virtual machine manager (VMM) to virtualize resources to enforce isolation. Considerable complexity may be needed to provide virtualized resources, as the virtualization software must manage very complex interactions to maintain proper isolation. Providing virtualized resources may also impose considerable performance overhead, especially when the system owner wants to run its own VMM, as this now requires nested virtualization.

As has been described, IP block reconfiguration may be performed at a platform SOC level with collaborative verification via a blockchain. Participating IP blocks can perform peer-to-peer (P2P) verification, with verification results captured in a blockchain for integrity and tracking. In addition or alternatively to allowing FPGA reconfiguration of an SOC, the present disclosure provides for reconfiguration at the higher platform level, supporting both static and dynamic IP block reconfiguration. The present disclosure provides for partitioning schemes at SOC level that are policy driven and that can be optionally administered with external administrative support, for example via an out-of-band management console. Also, reconfiguration may be policy driven (e.g., depending on workload, security mitigations desired, etc.). Furthermore, management module 64 and microsystem manager 24 may apply machine learning rules and inference in conjunction with provisioned policies to interpret platform workload characteristics and potential vulnerabilities to create tailored reconfiguration profiles to provide for reconfiguration efficiency. In addition, platform-level reconfiguration may be vetted according to secure boot and trusted boot requirements.

The CVB may be used to record and audit application of dynamic partitioning rules for review by blockchain participants in a collaborative manner. The aid of a blockchain may ensure that an attacker cannot introduce partitioning changes not specified by vetted rules or apply partitioning changes without proper authorization.

Hub 20 may be implemented as a first IP block to be booted, and as indicate above, hub 20 may contain a trustworthy computing environment. For instance, hub 20 may include TPM 28, a Converged Security and Manageability Engine (CSME), etc. And once hub 20 boots, it may then be configured with dynamic partitioning rules which may be dynamically provisioned or applied.

The reconfiguration process described herein uses platform-level hardware (instead of software like a VMM) to directly partition an SOC into multiple independent isolated systems in a collaborative policy driven manner. This approach could be applied only on a small number of highly important resources, all the way up to the entire SOC. For instance, as indicate above, banks of processing cores may be directly assigned to a microsystem so that those cores cannot be accessed or interfered with by other microsystems. Also, the present teachings may be used to partitioning the last-level cache(s) into independent chunks, with each chunk being available only to particular microsystem, instead of being globally shared. Also, each microsystem may be provisioned with different key to be used for memory encryption.

Also, the embodiment of FIG. 1 shows an initial configuration in which all cores are allocated to microsystems. But in other embodiments, one or more cores (or other components) may remain unallocated in the initial configuration, and subsequently the microsystem manager may dynamically allocate those cores (or other components) to specific microsystems, as needed. Also, the process of FIGS. 4A through 4D discusses the dynamic reallocation of cores among microsystems. However, other type of components may be allocated to microsystems and reallocated among microsystems in other embodiments or scenarios. For instance, the present teachings may be used to create managed pools of programmable devices which are used intermittently (e.g., direct memory access (DMA) engines, graphics execution units (EUs), etc.), allowing those devices to be dynamically shared, with different microsystems using a device at different times, but with each device forced to operate only within a particular microsystem or domain at any particular time. Physical memory space may also be partitioned into ranges, with different ranges assigned to different microsystems.

In light of the principles and example embodiments described and illustrated herein, it will be recognized that the illustrated embodiments can be modified in arrangement and detail without departing from such principles. For example, in an alternative embodiment, a DPS may use multiple whitelists. Similarly, as indicated above, operations that are described as being performed by a single boot module may, in alternative embodiments, be performed by a set of two or more related boot modules.

Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

This disclosure may refer to instructions, functions, procedures, data structures, application programs, microcode, configuration settings, and other kinds of data. As described above, when the data is accessed by a machine or device, the machine or device may respond by performing tasks, defining abstract data types, establishing a particular hardware configuration, and/or performing other operations. For instance, data storage, RAM, and/or flash memory may include various sets of instructions which, when executed, perform various operations. Such sets of instructions may be referred to in general as software. And software that is used during the boot process may be referred to as firmware. Software that is stored in nonvolatile memory may also be referred to as firmware. In addition, terms like "program" and "module" may be used in general to cover a broad range of software constructs, including applications, routines, drivers, subprograms, processes, and other types of software components. Any suitable operating environment and programming language (or combination of operating environments and programming languages) may be used to implement software components described herein.

Alternative embodiments include machine-accessible media encoding instructions or control logic for performing the operations described herein. Such embodiments may also be referred to as program products. Such machine-accessible media may include, without limitation, tangible storage media such as magnetic disks, optical disks, RAM, ROM, etc., as well as processors, controllers, and other components that include RAM, ROM, and/or other storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc. Also, the terms "nonvolatile storage" and "NVS" may be used in general to refer to nonvolatile memory, magnetic or optical disks, and other storage technologies which can keep data without power.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an application-specific integrated circuit, etc.).

In at least one embodiment, the instructions for all relevant components may be stored in one non-transitory machine-accessible medium. In at least one other embodiment, two or more non-transitory machine-accessible media may be used for storing the instructions for the relevant components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines. Similarly, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

The present teachings may be used to advantage in many different kinds of data processing systems. Example data processing systems may include, without limitation, SOCs, wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a processing core, a CPU, etc.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a DPS with technology for dynamically reconfiguring an SOC. The DPS comprises an SOC with multiple semiconductor IP blocks. The IP blocks comprise at least one processor. The SOC comprises a microsystem manager. The DPS also comprises nonvolatile storage comprising bootcode and partitioning policies. The bootcode, when executed by the processor to boot the data processing system (DPS), uses the microsystem manager to automatically instantiate multiple different microsystems within the DPS based on the partitioning policies. The operation of automatically instantiating multiple different microsystems comprises automatically instantiating a management microsystem within the DPS. The management microsystem enables to DPS to automatically determine that reallocation of at least one of the IP blocks is desired, based on (a) monitored conditions of at least one of the microsystems and (b) the partitioning policies. The management microsystem also enables to DPS to, in response to determining that reallocation of at least one of the IP blocks is desired, automatically reallocate at least one of the IP blocks from one of the microsystems to another of the microsystems without resetting at least one of the microsystems.

Example A2 is a data processing system according to Example A1, wherein the different microsystems comprise a first microsystem, a second microsystem, and a third microsystem; and the operation of automatically reallocating at least one of the IP blocks from one of the microsystems to another of the microsystems comprises reallocating a specific IP block from the first microsystem to the second microsystem without resetting the third microsystem.

Example A3 is a data processing system according to Example A1, further comprising a trusted platform module (TPM), a management module, and at least one default boot module in the bootcode. Also, the at least one default boot module, when executed by the processor to boot the DPS, allocates different IP blocks to the different microsystems. The microsystem manager enables the DPS to save at least one measurement for the at least one default boot module in the TPM when the DPS is booting. The management module enables the DPS to create a reconfiguration boot module. The reconfiguration boot module enables the DPS to reallocate at least one of the IP blocks. And the microsystem manager enables the DPS to save a measurement for the reconfiguration boot module in the TPM when the DPS automatically reallocates at least one of the IP blocks from one of the microsystems to another of the microsystems. Example A3 may also include the features of Example A2.

Example A4 is a data processing system according to Example A3, wherein (a) the at least one default boot module enables the DPS to verify at least one measurement for the at least one default boot module when booting the DPS; and (b) the reconfiguration boot module enables to DPS to verify at least one measurement for the reconfiguration boot module when the DPS automatically reallocates at least one of the IP blocks from one of the microsystems to another of the microsystems.

Example A5 is a data processing system according to Example A1, wherein the bootcode enables the DPS to provide at least one microsystem with a collaboration engine which enables the DPS to use a blockchain to verify whether a proposed reallocation is valid and to archive information identifying verified reallocations. Example A5 may also include the features of any one or more of Examples A2 through A4.

Example A6 is a data processing system according to Example A1, wherein the bootcode enables the DPS to provide at least three microsystems with at least three respective collaboration engines. The collaboration engines enable the DPS to (a) send a measurement for a proposed reallocation to two or more of the collaboration engines; and (b) determine whether a majority of the collaboration engines has verified that the proposed reallocation is valid. Example A6 may also include the features of any one or more of Examples A2 through A5.

Example A7 is a data processing system according to Example A1, wherein the bootcode enables the DPS to provide at least two microsystems with at least two respective collaboration engines, and the collaboration engines facilitate communication between the at least two microsystems at runtime. Example A7 may also include the features of any one or more of Examples A2 through A6.

Example A8 is a data processing system according to Example A1, wherein the bootcode comprises first and second boot modules which, when executed, instantiate first and second managed microsystems, respectively. Also, the operation of automatically reallocating at least one of the IP blocks from one of the microsystems to another of the microsystems without resetting at least one of the microsystems comprises automatically reallocating at least one of the IP blocks from the first managed microsystem to the second managed microsystem without resetting the management microsystem. Example A8 may also include the features of any one or more of Examples A2 through A7.

Example A9 is a data processing system according to Example A1, wherein the bootcode comprises first and second boot modules which, when executed, instantiate first and second managed microsystems, respectively. Also, the operation of automatically reallocating at least one of the IP blocks from one of the microsystems to another of the microsystems without resetting at least one of the microsystems comprises automatically reallocating at least one of the IP blocks from the management microsystem to the first managed microsystem without resetting the second managed microsystem. Example A9 may also include the features of any one or more of Examples A2 through A8.

Example A10 is a data processing system according to Example A1, wherein (a) the partitioning policies comprise a static partitioning policy (SPP) and a dynamic partitioning policy (DPP); (b) the SPP prescribes a default configuration of microsystems; and (c) the DPP identifies at least one alternative microsystem configuration as an approved configuration. Example A5 may also include the features of any one or more of Examples A2 through A9.

Example A11 is a data processing system according to Example A10, wherein the bootcode, when executed by the processor to boot the DPS, automatically allocates different IP blocks to the different microsystems within the DPS, based on the SPP.

Example B1 is an apparatus with technology for dynamically reconfiguring a system on a chip. The apparatus comprises at least one non-transitory machine-accessible storage medium, and bootcode stored at last partially in the at least one machine-accessible medium, wherein the bootcode, when executed by a data processing system (DPS) comprising a microsystem manager, uses the microsystem manager to automatically instantiate multiple different microsystems within the DPS based on partitioning policies. Also, the operation of automatically instantiating multiple different microsystems comprises (a) automatically allocating different semiconductor intellectual property (IP) blocks in a system on a chip (SOC) in the DPS to different microsystems within the DPS; and (b) automatically instantiating a management microsystem within the DPS. Also, the management microsystem enables to DPS to automatically determine, after the DPS has booted, that reallocation of at least one of the IP blocks is desired, based on (a) monitored conditions of at least one of the microsystems and (b) the partitioning policies. The management microsystem also enables to DPS to, in response to determining that reallocation of at least one of the IP blocks is desired, automatically reallocate at least one of the IP blocks from one of the microsystems to another of the microsystems without resetting at least one of the microsystems.

Example B2 is an apparatus according to Example B1, wherein the bootcode comprises first and second boot modules which, when executed, instantiate first and second managed microsystems, respectively. Also, the operation of automatically reallocating at least one of the IP blocks from one of the microsystems to another of the microsystems without resetting at least one of the microsystems comprises automatically reallocating at least one of the IP blocks from the first managed microsystem to the second managed microsystem without resetting the management microsystem.

Example B3 is an apparatus according to Example B1, wherein the bootcode comprises first and second boot modules which, when executed, instantiate first and second managed microsystems, respectively. Also, the operation of automatically reallocating at least one of the IP blocks from one of the microsystems to another of the microsystems without resetting at least one of the microsystems comprises automatically reallocating at least one of the IP blocks from the management microsystem to the first managed microsystem without resetting the second managed microsystem. Example B3 may also include the features of Example B2.

Example B4 is an apparatus according to Example B1, wherein the partitioning policies comprise a static partitioning policy (SPP) and a dynamic partitioning policy (DPP); the SPP prescribes a default configuration of microsystems; the DPP identifies at least one alternative microsystem configuration as an approved configuration; and the bootcode, when executed by the processor to boot the DPS, automatically allocates different IP blocks to the different microsystems within the DPS, based on the SPP. Example B4 may also include the features of any one or more of Examples B2 through B3.

Example C1 is a method for dynamically reconfiguring a system on a chip. The method comprises, when booting a data processing system (DPS) comprising a system on a chip (SOC) with multiple semiconductor intellectual property (IP) blocks, automatically allocating different IP blocks to multiple different microsystems within the DPS, based on a static partitioning policy (SPP). The method further comprises, after booting the DPS, determining that reallocation of at least one of the IP blocks is desired, based on (a) monitored conditions of at least one of the microsystems and (b) a dynamic partitioning policy (DPP). The method further comprises, in response to determining that reallocation of at least one of the IP blocks is desired, automatically reallocating at least one of the IP blocks from one of the microsystems to another of the microsystems without resetting at least one of the microsystems.

Example C2 is a method according to Example C1, wherein the different microsystems comprise a first microsystem, a second microsystem, and a third microsystem; and the operation of automatically reallocating at least one of the IP blocks from one of the microsystems to another of the microsystems comprises reallocating a specific IP block from the first microsystem to the second microsystem without resetting the third microsystem.

Example C3 is a method according to Example C1, further comprising (a) using at least one default boot module to allocate different IP blocks to the different microsystems when booting the DPS; (b) saving at least one measurement for the at least one default boot module in a trusted platform module (TPM) when booting the DPS; (c) using at least one reconfiguration boot module to reallocate at least one of the IP blocks; and (d) saving at least one measurement for the at least one reconfiguration boot module in the TPM when automatically reallocating at least one of the IP blocks from one of the microsystems to another of the microsystems. Example C3 may also include the features of Example C2.

Example C4 is a method according to Example C3, further comprising (a) verifying at least one measurement for the at least one default boot module when booting the DPS; and (b) verifying at least one measurement for the at least one reconfiguration boot module when automatically reallocating at least one of the IP blocks from one of the microsystems to another of the microsystems.

Example C5 is a method according to Example C1, further comprising using a blockchain that is managed by at least some of the microsystems to verify whether a proposed reallocation is valid and to archive information identifying verified reallocations. Example C5 may also include the features of any one or more of Examples C2 through C4.

Example C6 is a method according to Example C5, wherein each of at least three different microsystems comprises a collaboration engine. Also, the method further comprises using the collaboration engines and the blockchain to facilitate communication between at least two of the microsystems at runtime.

Example C7 is a method according to Example C5, wherein each of at least three different microsystems comprises a collaboration engine. Also, the operation of using a blockchain that is managed by the microsystems to verify whether a proposed reallocation is valid and to archive information identifying verified reallocations comprises (a) sending a measurement for the proposed reallocation to each of the collaboration engines; and (b) determining whether a majority of the collaboration engines has verified that the proposed reallocation is valid. Example C7 may also include the features of Example C6.

Example C8 is a method according to Example C1, wherein the DPS comprises first and second boot modules which, when executed, instantiate first and second managed microsystems, respectively. Also, the operation of automatically reallocating at least one of the IP blocks from one of the microsystems to another of the microsystems without resetting at least one of the microsystems comprises automatically reallocating at least one of the IP blocks from the first managed microsystem to the second managed microsystem without resetting the management microsystem. Example C8 may also include the features of any one or more of Examples C2 through C7.

Example C9 is a method according to Example C1, wherein the DPS comprises first and second boot modules which, when executed, instantiate first and second managed microsystems, respectively. Also, the operation of automatically reallocating at least one of the IP blocks from one of the microsystems to another of the microsystems without resetting at least one of the microsystems comprises automatically reallocating at least one of the IP blocks from the management microsystem to the first managed microsystem without resetting the second managed microsystem. Example C8 may also include the features of any one or more of Examples C2 through C8.

Example C10 is a method according to Example C1, wherein the SPP prescribes a default configuration of microsystems, and the DPP identifies at least one alternative microsystem configuration as an approved configuration. Example C9 may also include the features of any one or more of Examples C2 through C9.

Example C11 is a method according to Example C1, wherein the DPS comprises first and second boot modules. Also, the operation of automatically allocating different IP blocks to multiple different microsystems within the DPS, based on the SPP, comprises (a) calling the microsystem manager from the first boot module; (b) from the microsystem manager, querying the SPP for a next boot module; and (c) in response to the microsystem manager identifying the second boot module as the next boot module, automatically executing the second boot module after the first boot module finishes. Example C10 may also include the features of any one or more of Examples C2 through C10.

Example C12 is a method according to Example C11, wherein the first boot module allocates a first IP block to a first microsystem, and the second boot module allocates a second IP block to a second microsystem.

Example C13 is a method according to Example C11, wherein the operation of automatically reallocating at least one of the IP blocks from one of the microsystems to another of the microsystems without resetting at least one of the microsystems comprises automatically modifying the second boot module to change a microsystem configuration specified by the second boot module. Example C13 may also include the features of Example C12.

Example C14 is a method according to Example C13, wherein the operation of automatically reallocating at least one of the IP blocks from one of the microsystems to another of the microsystems without resetting at least one of the microsystems further comprises (a) resetting the second microsystem; and (b) after resetting the second microsystem, executing the modified second boot module.

Example C15 is a method according to Example C14, wherein the operation of automatically reallocating at least one of the IP blocks from one of the microsystems to another of the microsystems without resetting at least one of the microsystems further comprises (a) before resetting the second microsystem, automatically modifying the DPP to identify the modified second boot module as a new next boot module; and (b) after resetting the second microsystem, performing operations comprising (i) from the microsystem manager, using the DPP to determine that the modified second boot module should be used as the new next boot module; and (ii) after determining that the modified second boot module should be used as the new next boot module, automatically executing the modified second boot module.

Example C16 is a method according to Example C15, wherein the modified second boot module allocates the first IP block to the second microsystem. Also, the operation of automatically reallocating at least one of the IP blocks from one of the microsystems to another of the microsystems without resetting at least one of the microsystems further comprises resetting the first microsystem before executing the modified second boot module.

Example C17 is a method according to Example C16, wherein the operation of automatically reallocating at least one of the IP blocks from one of the microsystems to another of the microsystems without resetting at least one of the microsystems further comprises (a) before resetting the second microsystem, automatically modifying the DPP to identify a modified first boot module as another new next boot module; and (b) after modifying the DPP to identify the modified first boot module as another new next boot module, resetting the first microsystem.

Example D is at least one machine-accessible medium comprising computer instructions to support dynamic reconfiguration of a system on a chip, wherein the computer instructions, in response to being executed in a device, enable the device to perform a method according to any of Examples C11 through C17.

Example E is a data processing system with technology to support dynamic reconfiguration of a system on a chip. The data processing system comprises a processing element; at least one machine-accessible medium responsive to the processing element; and computer instructions stored at least partially in the at least one machine-accessible medium, wherein the computer instructions, in response to being executed, enable the data processing system to perform a method according to any of Examples C11 through C17.

Example F is a data processing system with technology to support dynamic reconfiguration of a system on a chip. The data processing system comprises means for performing the method of any one of Examples C11 through C17.

What is claimed is:

1. A data processing system with technology for dynamically reconfiguring a system on a chip, the data processing system comprising:
    a system on a chip (SOC) with multiple semiconductor intellectual property (IP) blocks, the IP blocks comprising at least one processor;
    a microsystem manager in the SOC; and
    nonvolatile storage comprising bootcode and partitioning policies;
    wherein the bootcode, when executed by the processor to boot the data processing system (DPS), uses the microsystem manager to automatically instantiate multiple different microsystems within the DPS based on the partitioning policies, wherein the multiple different microsystems comprise a management microsystem, a first managed microsystem, and a second managed microsystem;
    wherein the management microsystem enables to DPS to:
        automatically determine that reallocation of at least one of the IP blocks is desired, based on (a) monitored conditions of at least one of the microsystems and (b) the partitioning policies; and
        in response to determining that reallocation of at least one of the IP blocks is desired, automatically reallocate at least one of the IP blocks from the management microsystem to the first managed microsystem without resetting the second managed microsystem.

2. The data processing system according to claim 1, wherein:
    the operation of automatically reallocating at least one of the IP blocks further comprises reallocating a specific IP block from the first managed microsystem to the second managed microsystem without resetting the management microsystem.

3. The data processing system according to claim 1, further comprising:
    a trusted platform module (TPM);
    a management module; and
    at least one default boot module in the bootcode, wherein the at least one default boot module, when executed by the processor to boot the DPS, allocates different IP blocks to the different microsystems; and wherein:
        the microsystem manager enables the DPS to save at least one measurement for the at least one default boot module in the TPM when the DPS is booting;
        the management module enables the DPS to create a reconfiguration boot module;
        the reconfiguration boot module enables the DPS to reallocate at least one of the IP blocks; and
        the microsystem manager enables the DPS to save a measurement for the reconfiguration boot module in the TPM when the DPS automatically reallocates at least one of the IP blocks from one of the microsystems to another of the microsystems.

4. The data processing system according to claim 3, wherein:
    the at least one default boot module enables the DPS to verify at least one measurement for the at least one default boot module when booting the DPS; and
    the reconfiguration boot module enables to DPS to verify at least one measurement for the reconfiguration boot module when the DPS automatically reallocates at least one of the IP blocks from one of the microsystems to another of the microsystems.

5. The data processing system according to claim 1, wherein the bootcode enables the DPS to:
    provide at least one microsystem with a collaboration engine which enables the DPS to use a blockchain to verify whether a proposed reallocation is valid and to archive information identifying verified reallocations.

6. The data processing system according to claim 1, wherein the bootcode enables the DPS to:
    provide at least three microsystems with at least three respective collaboration engines, wherein the collaboration engines enable the DPS to:
        send a measurement for a proposed reallocation to two or more of the collaboration engines; and
        determine whether a majority of the collaboration engines has verified that the proposed reallocation is valid.

7. The data processing system according to claim 1, wherein:
    the bootcode enables the DPS to provide at least two microsystems with at least two respective collaboration engines; and
    the collaboration engines facilitate communication between the at least two microsystems at runtime.

8. The data processing system according to claim 1, wherein:
    the bootcode comprises first and second boot modules which, when executed, instantiate the first and second managed microsystems, respectively; and
    the operation of automatically reallocating at least one of the IP blocks further comprises:
        automatically reallocating at least one of the IP blocks from the first managed microsystem to the second managed microsystem without resetting the management microsystem.

9. The data processing system according to claim 1, wherein:
    the bootcode comprises first and second boot modules which, when executed, instantiate the first and second managed microsystems, respectively.

10. The data processing system according to claim 1, wherein:
    the partitioning policies comprise a static partitioning policy (SPP) and a dynamic partitioning policy (DPP);
    the SPP prescribes a default configuration of microsystems; and the DPP identifies at least one alternative microsystem configuration as an approved configuration.

11. The data processing system according to claim 10, wherein the bootcode, when executed by the processor to boot the DPS, automatically allocates different IP blocks to the different microsystems within the DPS, based on the SPP.

12. An apparatus with technology for dynamically reconfiguring a system on a chip, the apparatus comprising:
at least one non-transitory machine-accessible storage medium; and
bootcode stored at last partially in the at least one machine-accessible medium, wherein the bootcode, when executed by a data processing system (DPS) comprising a microsystem manager, uses the microsystem manager to automatically instantiate multiple different microsystems within the DPS based on partitioning policies, wherein the multiple different microsystems comprise a management microsystem, a first managed microsystem, and a second managed micro system and wherein the operation of automatically instantiating the management microsystem, the first managed microsystem, and the second managed microsystem comprises automatically allocating different semiconductor intellectual property (IP) blocks in a system on a chip (SOC) in the DPS to the management microsystem, the first managed microsystem, and the second managed microsystem; and
wherein the management microsystem enables to DPS to:
automatically determine, after the DPS has booted, that reallocation of at least one of the IP blocks is desired, based on (a) monitored conditions of at least one of the microsystems and (b) the partitioning policies; and
in response to determining that reallocation of at least one of the IP blocks is desired, automatically reallocate at least one of the IP blocks from the management microsystem to the first managed microsystem without resetting the second managed microsystem.

13. The apparatus according to claim 12, wherein:
the bootcode comprises first and second boot modules which, when executed, instantiate the first and second managed microsystems, respectively.

14. The apparatus according to claim 12, wherein:
the bootcode comprises first and second boot modules which, when executed, instantiate the first and second managed microsystems, respectively; and
the operation of automatically reallocating at least one of the IP blocks further comprises:
automatically reallocating at least one of the IP blocks from the management microsystem to the first managed microsystem without resetting the second managed microsystem.

15. The apparatus according to claim 12, wherein:
the partitioning policies comprise a static partitioning policy (SPP) and a dynamic partitioning policy (DPP);
the SPP prescribes a default configuration of microsystems;
the DPP identifies at least one alternative microsystem configuration as an approved configuration; and
the bootcode, when executed by the processor to boot the DPS, automatically allocates different IP blocks to the microsystems within the DPS, based on the SPP.

16. A method for dynamically reconfiguring a system on a chip, the method comprising:
when booting a data processing system (DPS) comprising a system on a chip (SOC) with multiple semiconductor intellectual property (IP) blocks, automatically allocating different IP blocks to multiple different microsystems within the DPS, based on a static partitioning policy (SPP), wherein the multiple different microsystems comprise a management microsystem, a first managed microsystem, and a second managed microsystem;
after booting the DPS, determining that reallocation of at least one of the IP blocks is desired, based on (a) monitored conditions of at least one of the microsystems and (b) a dynamic partitioning policy (DPP); and
in response to determining that reallocation of at least one of the IP blocks is desired, automatically reallocating at least one of the IP blocks from the management microsystem to the first managed microsystem without resetting the second managed microsystem.

17. The method according to claim 16, wherein:
the operation of automatically reallocating at least one of the IP blocks further comprises reallocating a specific IP block from the first managed microsystem to the second managed microsystem without resetting the management microsystem.

18. The method according to claim 16, further comprising:
using at least one default boot module to allocate different IP blocks to the different microsystems when booting the DPS;
saving at least one measurement for the at least one default boot module in a trusted platform module (TPM) when booting the DPS;
using at least one reconfiguration boot module to reallocate at least one of the IP blocks; and
saving at least one measurement for the at least one reconfiguration boot module in the TPM when automatically reallocating at least one of the IP blocks from one of the microsystems to another of the microsystems.

19. The method according to claim 18, further comprising:
verifying at least one measurement for the at least one default boot module when booting the DPS; and
verifying at least one measurement for the at least one reconfiguration boot module when automatically reallocating at least one of the IP blocks from one of the microsystems to another of the microsystems.

20. The method according to claim 16, further comprising:
using a blockchain that is managed by at least some of the microsystems to verify whether a proposed reallocation is valid and to archive information identifying verified reallocations.

21. The method according to claim 16, wherein:
the DPS comprises first and second boot modules which, when executed, instantiate the first and second managed microsystems, respectively; and
the operation of automatically reallocating at least one of the IP blocks further comprises:
automatically reallocating at least one of the IP blocks from the first managed microsystem to the second managed microsystem without resetting the management microsystem.

22. The method according to claim 16, wherein:
the DPS comprises first and second boot modules which, when executed, instantiate the first and second managed microsystems, respectively.

23. The method according to claim 16, wherein:

the SPP prescribes a default configuration of microsystems; and the DPP identifies at least one alternative microsystem configuration as an approved configuration.

24. The method according to claim 16, wherein:

the DPS comprises first and second boot modules; and the operation of automatically allocating different IP blocks to multiple different microsystems within the DPS, based on the SPP, comprises:

calling the microsystem manager from the first boot module;

from the microsystem manager, querying the SPP for a next boot module; and in response to the microsystem manager identifying the second boot module as the next boot module, automatically executing the second boot module after the first boot module finishes.

25. The method according to claim 24, wherein:

the first boot module allocates a first IP block to a first microsystem; and the second boot module allocates a second IP block to a second microsystem.

\* \* \* \* \*